United States Patent Office 3,674,456
Patented July 4, 1972

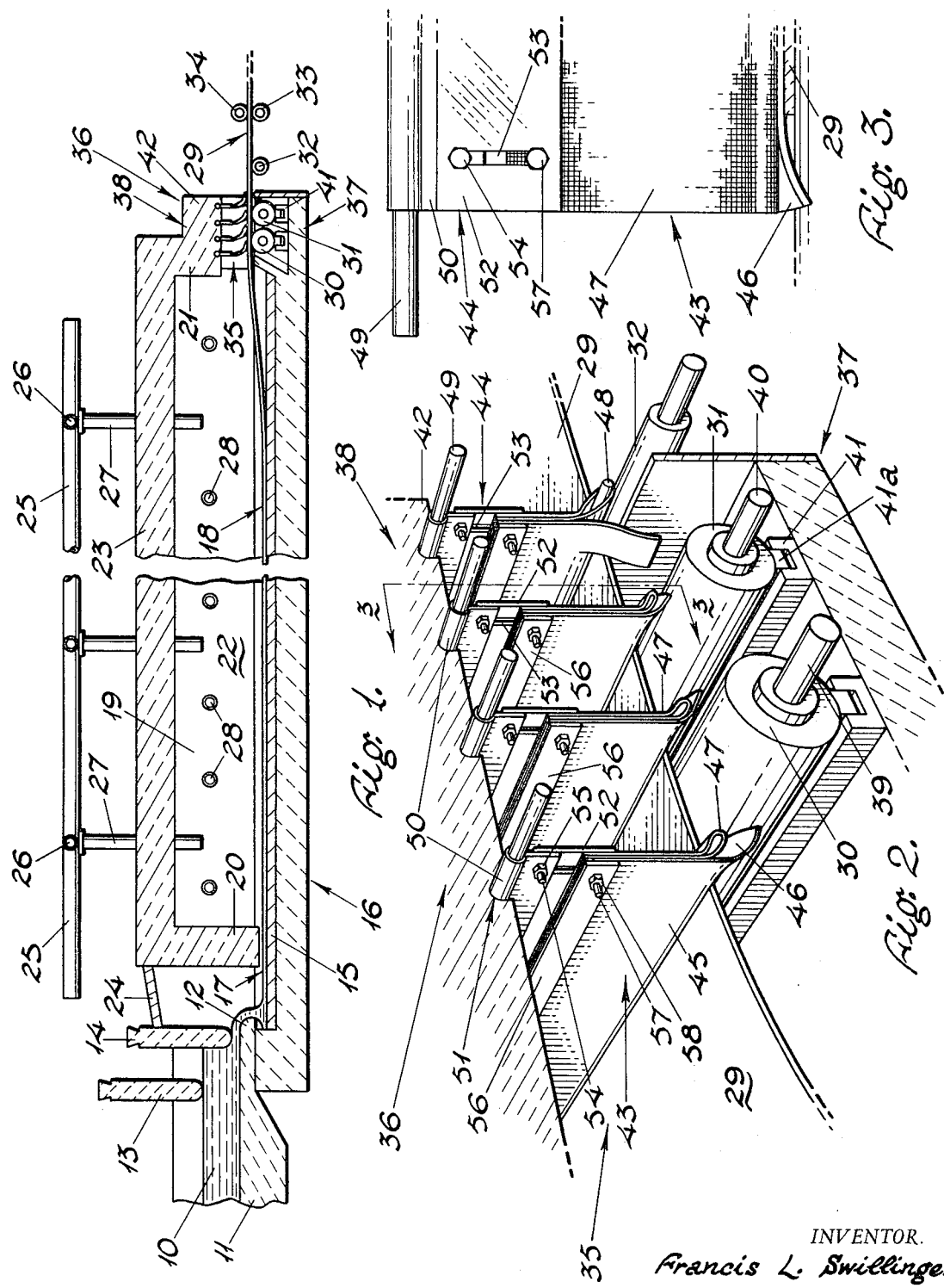

3,674,456
EXIT SEALING DRAPE FOR FLOAT GLASS BATH
Francis L. Swillinger, Perrysburg, Ohio, assignor to Libbey-Owens-Ford Company, Toledo, Ohio
Filed Feb. 25, 1970, Ser. No. 14,002
The portion of the term of the patent subsequent to Sept. 21, 1988, has been disclaimed
Int. Cl. C03b 18/02
U.S. Cl. 65—182 R                    6 Claims

ABSTRACT OF THE DISCLOSURE

Sealing the exit passageway of the plenum chamber enclosing the special atmosphere of a float glass apparatus for the production of glass having exceptional surface quality such as mirror glass, including a special closure drape swingably mounted in the passageway and having a first layer of a flexible, lubricating fibrous carbon material, harmless to the mirror finish of the glass ribbon and of sufficient length that the continuous passage of the glass ribbon below causes a segment of the free end thereof to be dragged in a horizontal direction thereon. A second layer which inhibits the passage of gas is suspended behind the first layer with its lower end supported on the horizontal segment of the first layer.

BACKGROUND OF THE INVENTION

Field of the invention

The present invention relates broadly to the production of flat glass by the float process and, more particularly, to an improved atmosphere seal at the exit end of the float bath, which includes a draped curtain having an outer layer which continually contacts the upper surface of the glass ribbon, but without perceptible damage thereto, and thereby allows such contact even during the production of glass for which an exceptionally high surface quality is required, such as that employed in making mirrors.

Description of the prior art

A conventional form of float glass apparatus is illustrated and described in U.S. Pat. No. 3,083,551, granted Apr. 2, 1963; and, as there explained, the manufacture of flat glass by the float process involves the delivery of glass at a controlled rate onto a bath of molten metal (such as tin or an alloy of tin, for example) and advancement thereof along the bath under physical and thermal conditions which assure (1) that a layer of molten glass will be established on the bath, (2) that the glass in the layer can flow laterally unhindered to form on the surface of the bath a buoyant body of molten glass of stable or equilibrium thickness, and (3) that the buoyant body will be continually advanced along the bath in ribbon form and progressively and sufficiently cooled to permit it to be taken from the bath at the exit end thereof by mechanical means without harm to its surfaces.

The space above the bath is tightly enclosed by the upper tank structure to form a plenum chamber. A protective so-called float atmosphere (normally, a mixture of nitrogen and hydrogen) which does not react chemically with either the molten metal of the bath or the glass layer thereon is maintained in the plenum chamber, thereby protecting the process from contamination by reactive gases such as atmospheric oxygen.

A slightly positive pressure is normally maintained within the plenum chamber so that in any areas where infiltration of outside air might otherwise occur, an outward leakage is maintained to protect the inert quality of the float atmosphere within. The larger size of the slot necessary to accommodate the passage of the glass ribbon at the exit end of the bath, coupled with the desirability of keeping the loss of float atmosphere through outward leakage to a minimum, makes it necessary to close the opening as much as possible to maintain the aforementioned positive pressure within the chamber.

Accordingly, with the tank structures heretofore used, it has been customary to append a short extension chamber or vestibule onto the exit end of the tank apparatus containing a series of spaced asbestos cloth drapes suspended vertically within the chamber. These drapes span the width and height of the passageway such that the bottom of each drape engages and drags along the surface of the glass ribbon continually moving therethrough, thereby providing a continuous flexible contact seal.

The contact sealing means of the prior art, while effecting a suitable gas seal, produced detrimental minute scratching effects on the surface of the glass ribbon as it passed underneath thereby rendering the product unsuitable for use in mirrors and other such applications which require a perfectly smooth surface. When glass for mirrors was produced in such apparatus, the drapes had to be raised so that they ceased to drag on the ribbon, but this resulted in a loss of positive pressure within the plenum and the undesirable ingress of oxygen into the bath atmosphere which noticeably affected the quality of the glass produced.

SUMMARY OF THE INVENTION

According to the present invention there is provided a contact seal at the exit end of the plenum chamber which does not harm the surface of the glass ribbon for such purposes. A layer of material, substantially inert to the environment and able to slide easily over the layer of glass without detriment to the surface thereof, is provided in front of and adjacent the conventional drape material, forming therewith a composite drape in which only the harmless layer contacts the glass ribbon.

It is, therefore, a primary object of the invention to provide an improved sealing closure for the atmosphere-filled plenum chamber of a continuous furnace.

Another object is to provide an improved exit sealing drape which will provide a contact seal with the ribbon of glass which can be used in the production of glass requiring the final surface smoothness of mirror glass.

Further objects and advantages of the invention will become apparent during the course of the following description when taken in connection with the accompanying drawings.

BRIEF DESCRIPTION OF THE DRAWINGS

In the drawings, wherein like numerals are employed to designate like parts throughout:

FIG. 1 is a longitudinal, vertical, sectional view through typical float glass producing apparatus, but equipped with the exit-sealing drapes of the invention;

FIG. 2 is an enlarged, fragmentary perspective view of the discharge end of the apparatus of FIG. 1 illustrating that embodiment of the invention; and FIG. 3 is an enlarged, fragmentary, elevational view of the drape of the invention from the downstream side thereof.

DESCRIPTION OF THE PREFERRED EMBODIMENTS

Referring now more particularly to the drawings, there is illustrated in FIG. 1 a typical float glass producing apparatus substantially similar to that disclosed in U.S. Pat. No. 3,083,551. In this apparatus molten glass 10 is supplied from a forehearth 11 through and over a spout 12 in an amount regulated and controlled by a blocking tweel 13 and a control tweel 14.

The glass flows from the spout 12 onto a molten metal bath 15 contained in a tank 16, where it spreads to form a buoyant body of molten glass, indicated at 17, from which a buoyant body of stable thickness 18 develops in ribbon form.

Above the bath 15 a closed head space or plenum chamber 19 is defined by entry endwall 20, exit endwall 21, sidewalls 22, and roof 23, together with a roof extension 24, which head space contains the protective float atmosphere (normally, a mixture of nitrogen and hydrogen). The atmosphere is initially introduced, and thereafter continually replenished, from a source of supply by means of a ducting system which includes a main header 25 connected by branches 26 to plenum inlet ducts 27. The desired temperatures are maintained along the bath by means of temperature regulating elements, shown generally at 28, spaced therealong.

The stable or equilibrium layer of glass 18 is progressively cooled as it advances along the bath and thereby achieves a degree of stiffness such that the ultimate ribbon 29 may be transferred from the exit end to an adjacent lehr (not shown) by mechanical means without harm to its lower surface. One form of such mechanical conveying means typically employed for this purpose is comprised of spaced parallel lift out rolls 30 and 31 and support rolls 32 and 33 located beneath the ribbon and a top roll 34 superimposed congruently above support roll 33. Any or all of the rolls may be driven by conventional means to apply a tractive effort to the ribbon of glass to advance it along the bath toward the discharge end thereof. When a ribbon of less than equilibrium thickness is desired, the speed of the rolls may be increased thereby modifying their tractive effort and attenuating the equilibrium layer 18.

As discussed above, it is desirable that the plenum chamber be constructed as gas tight as possible to substantially eliminate the ingress of room air and minimize the egress of float atmosphere. By maintaining a slightly positive pressure within the plenum chamber, leakage through small openings occurs in the form of an outward flow of float atmosphere.

The ribbon is removed from the bath through an exit opening 35 at the end thereof. A large opening of this type presents a much more difficult sealing problem. The opening 35 must be substantially larger than the glass ribbon 29 to allow both vertical and horizontal freedom of motion of the ribbon as it continuously emerges from the bath; and, because of the open area involved, the plenum pressure cannot be maintained without some form of auxiliary sealing means.

It has therefore been customary to provide a sealing means within a short exit throat or vestibule chamber shown generally at 36, continuous with the exit end of the tank structure 16 and including a lower section 37 and an upper section 38. As best seen in FIG. 2, the lower section 37 encloses the initial conveyor support or lift-out rolls 30 and 31, with respective shafts 39 and 40 extending through suitably sealed sidewall openings (not shown) and supported by conventional external journaling means (also, not shown). By means of barriers 41 having spring loaded sealing members 41a bearing against the rolls 30 and 31, an atmosphere seal of the area beneath the ribbon is effected.

The upper section 38 includes a suspended arch roof 42 spanning spaced sidewalls (not shown). A preferred embodiment of the present invention is shown and will be described in conjunction with the upper section.

As discussed above, the abrasive effect of the prior art drapes (normally fabricated of one or more loops of asbestos cloth) required that they be lifted up out of contact with the surface of the ribbon during the production of mirror glass, thereby producing a loss of plenum pressure and allowing ingress of air into the plenum chamber with consequent detrimental effects on the quality of glass produced.

In accordance with the present invention, it has been discovered that a fabric made of woven fibrous carbon, in addition to exhibiting the requisite heat and wear resistance, because of its lubricating nature, will slide easily along the surface of the glass ribbon without adverse effect thereon. It has also been found that the fibrous carbon fabric can be used in combination with a shorter layer of a suitable backing material to provide a barrier which successfully inhibits the passage of gas therethrough.

Thus, according to the illustrated embodiment of the present invention, as best shown in FIG. 2, a plurality of spaced, composite drapes 43 are arranged within the exit chamber 36. Each drape 43 depends from a swingable, adjustable mounting means, shown generally at 44, and extends vertically therefrom to contact the glass ribbon 29 and horizontally beyond the edges of the glass ribbon 29 to contact suitable side sealing means (not shown) which are provided on either side of the exit chamber 36 to complete the closure of the passage area.

The drapes include an initial layer 45 of flexible woven fibrous carbon material located on the upstream side relative to the direction of travel of the glass ribbon. This initial layer is longer than the nominal vertical distance from the point of suspension to the surface of the glass ribbon, and the movement of the glass ribbon causes this added length to form a hoirzontal segment 46 which slides along the surface of the ribbon. A second, shorter gas-impervious layer 47 which may be a loop of asbestos cloth, is mounted behind the first such that the looped bottom rides on the horizontal segment 46 of the initial layer 45. This provides a gas impervious membrane over the full area of the drape, in which the bottom loop acts to help hold the lubricating segment 46 in continuous contact with the glass ribbon 29, and prevents the abrasive material of the layer 47 from coming in direct contact with same. A more positive bottom seal may be achieved by inserting a hold down rod 48 through the bottom loop of the layer 47, thereby causing the layer to bear more heavily against the horizontal segment 46.

The illustrated individual mounting means comprises a support rod 49 supported at its ends by suitable means (not shown) spanning the chamber 36 and extending through the loop of a swingable hinge 50 which is received in a recess 51 in the roof 42. A hanger plate 52 having a slot 53 adjacent one end and a second symmetrically placed slot adjacent the other end (not shown) is removably secured to the hinge 50 at the upper end of the slots 53 as by bolts 54 with nuts 55, to adjustably span the vertical interval between the hinge 50 and the drape 43. The upper portion of the layers 45 and 47 of the drape 43 is engaged between the plate 52 and a clamping plate 56 as by bolts 57 and nuts 58. In conjunction with slots 53, by loosening one or more of the nuts 58, the suspended drape may readily be raised, lowered or leveled, and then maintained in the adjusted position by tightening the nuts.

In actual commercial practice, using a series of four such drapes spaced within the exit chamber 36 it has been found possible to maintain a positive plenum pressure of 1.5 mm. of water over and above that previously attainable in the production of mirror glass. This figure closely approaches that obtained using the contact drapes of the prior art in the production of regular glass, i.e. glass having less critical surface requirements. In addition, float atmosphere consumption or loss, long associated with the production of mirror glass, has been reduced significantly by elimination of the gap adjacent the surface of the ribbon.

Although the illustrated embodiment discloses a particular material, namely, a loop of asbestos cloth, as the gas-resistant second layer, it is contemplated that many other suitable materials may also be employed. For example, a metal plate may be substituted for the looped asbestos layer 47. The plate, which may be of thin corrugated stainless steel with the corrugations oriented vertically, extends downwardly to a point slightly above the ribbon, and the horizontal segment 46 is carried beneath the plate on the surface of the ribbon.

Also, it will be readily appreciated that the invention may be utilized as a closure means for other types of continuously furnace equipment with generally similar sealing requirements, and its use with the float glass producing apparatus is by way of illustrating one adaptation thereof.

I claim:

1. In apparatus for forming flat glass having at least one surface substantially free from surface defects wherein a ribbon of glass is formed on a bath of molten metal contained within a tank and removed to an adjacent annealing lehr, including a plenum chamber positioned over said tank enclosing a protective atmosphere, an exit passageway at one end of said tank through which said ribbon is removed from said tank to another atmosphere, and a closure means disposed transversely over said ribbon within said exit passageway to restrict movement of said protective atmosphere and said other atmosphere therethrough, the improvement wherein said closure means comprises a first gas-impervious closure member suspended in said exit passageway substantially closing off the area above said ribbon in said passageway to movement of said protective atmosphere and said other atmosphere therethrough, a second closure member of lubricating non-abrasive material suspended in said passageway adjacent said first closure member and on the side thereof facing said tank, said second closure member extending downwardly and being of sufficient length so as to have a substantially horizontal component extending along and sliding upon the upper surface of said ribbon beneath said first closure member, said horizontal component being urged against said upper surface by said first closure member bearing thereagainst while preventing contact between said first closure member and said surface, thereby enabling maintenance of an increased pressure in said protective atmosphere.

2. Apparatus for forming flat glass having at least one surface substantially free of surface defects as claimed in claim 1, wherein said first closure member is a sheet of flexible material doubled over upon itself to form a loop at its lower end, said loop resting upon said horizontal segment of said second closure member.

3. Apparatus for forming flat glass having at least one surface substantially free of surface defects as claimed in claim 2, including an elongated member within said loop causing said loop to exert additional pressure against said horizontal segment.

4. Apparatus for forming flat glass having at least one surface substantially free of surface defects as claimed in claim 1, wherein said first closure member comprises a plate of stiff, heat-resisting material with its lower edge positioned above the upper surface of said ribbon.

5. Apparatus for forming flat glass having at least one surface substantially free of surface defects as claimed in claim 1, in which said second closure member comprises a batt of woven, fibrous, carbonaceous material.

6. Apparatus for forming flat glass having at least one surface substantially free of surface defects as claimed in claim 1, including means providing adjustment of the elevation of said second closure member relative to said first closure member and said ribbon, said elevation adjustment means comprising a swingable hinge extending across the top of said exit passageway, a hangar plate having vertical slots therein, means extending through said slots adjustably clamping said hangar plate to said hinge, a clamping plate extending along the lower margin of said hangar plate with the upper margins of said first and second closure members between said clamping and hangar plates, and means extending through said slots and first and second closure members urging said clamping plate towards said hangar plate to clamp said first and second closure members therebetween.

References Cited

UNITED STATES PATENTS 3,565,597   2/1971   Pilkington et al. _____ 65—182

ARTHUR D. KELLOGG, Primary Examiner

U.S. Cl. X.R.

65—27, 99 A, 168